July 29, 1958     A. CIERPIK, JR     2,845,288
LOCKING TURNBUCKLE
Filed Feb. 15, 1954
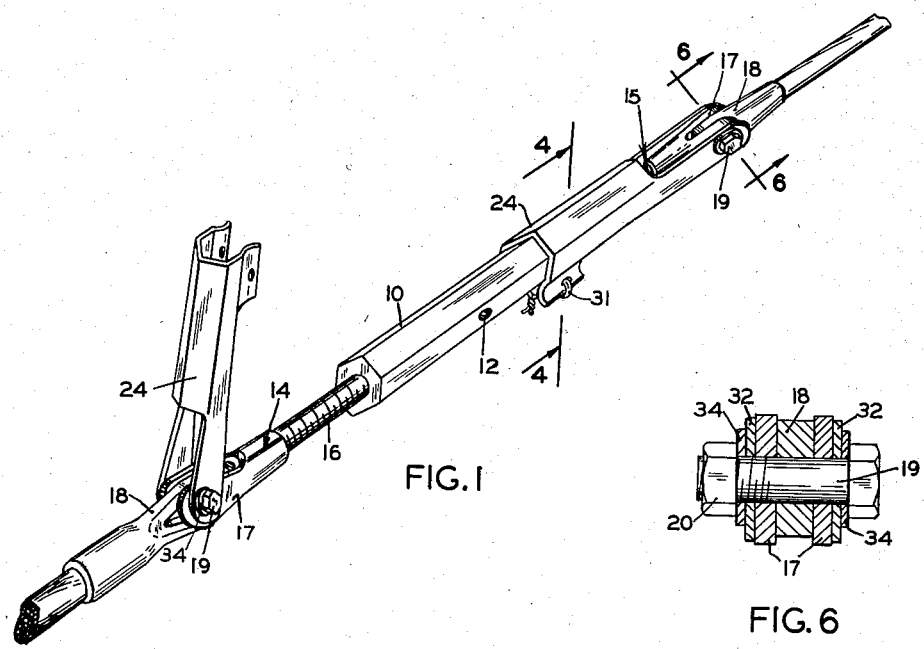
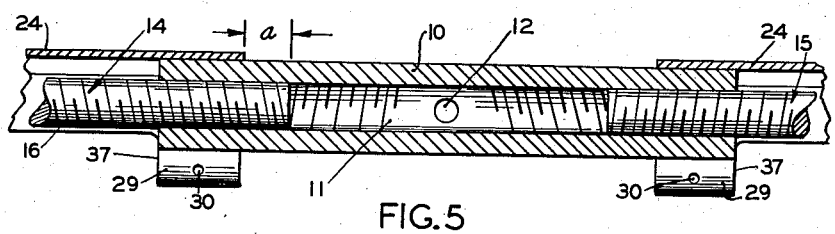
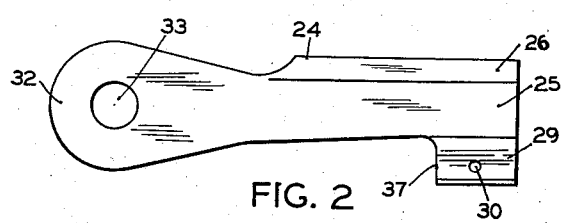
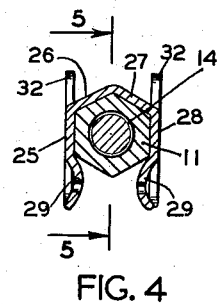
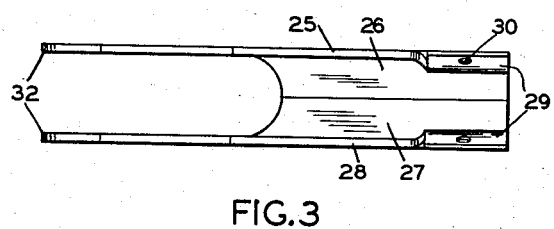
INVENTOR.
ALBERT CIERPIK JR.
BY Buckhorn and Cheatham
ATTORNEYS

United States Patent Office 2,845,288
Patented July 29, 1958

2,845,288
LOCKING TURNBUCKLE

Albert Cierpik, Jr., Massapequa Park, N. Y., assignor to Phillips Screw Company, a corporation of Delaware Application February 15, 1954, Serial No. 410,334

1 Claim. (Cl. 287—60)

This invention relates to locking turnbuckles.

The present practice is to secure turnbuckles against turning and loosening, due to vibration or other causes, by wiring. The wire is passed through and around the link and stubs following a definitely prescribed procedure, and the wiring operation consumes considerable time. In cramped locations, the wiring may be extremely difficult or even impossible. Also, inspection of the wiring may be difficult and frequently may not reveal breakage of a wire.

While turnbuckle locking devices have been suggested, those proposed heretofore have not met with any considerable acceptance, due, largely, to excessive cost and complication and also because they have been, in many cases, as susceptible to failure under severe vibration as the turnbuckle itself. Moreover, in some instances the proposed devices required excessive manipulating space.

The general object of the present invention is to provide a locking turnbuckle capable of general use and which is not subject to the foregoing deficiencies.

A further object of the invention is to provide a locking arrangement for turnbuckles which will facilitate determining the degree of extension of the turnbuckle.

In accordance with the illustrated embodiment, the turnbuckle of the present invention comprises a hexagonal barrel in the opposite ends of which are received cooperatively threaded stubs. Pivotally mounted on at least one of the stubs is a clip element having an end formed to fit over and snap onto the barrel, whereby the stub and barrel are secured against rotation relative to one another, but readily releasable to permit adjustment of the turnbuckle. The clip is so designed that the position of adjustment of the turnbuckle can be·readily determined.

For a more detailed description of the invention reference is made to the accompanying drawings wherein:

Fig. 1 is a perspective view of a turnbuckle equipped with locking clips in accordance with the invention;

Fig. 2 is an enlarged side elevation of the locking clip;

Fig. 3 is a bottom elevation of the locking clip of Fig. 2;

Fig. 4 is a sectional view taken along line 4—4 of Fig. 1;

Fig. 5 is a fragmentary, medial longitudinal section through the turnbuckle showing the same with the clips at the opposite ends in locking position; and Fig. 6 is a sectional view taken along line 6—6 of Fig. 1.

With particular reference now to the drawing, the turnbuckle link or barrel is indicated at 10, and as shown, is preferably hexagonal and of uniform cross-section throughout its length. The barrel is provided with an axial bore 11, the opposite ends of which are provided with right and left-hand threads, respectively, as is customary and shown most clearly in Fig. 5. The barrel may be provided with a cross-bore 12 for accommodating wiring or a pin wrench.

Received in the opposite ends of the barrel 10 are the cooperatively threaded stems 16 of the eyebolts or stubs 14 and 15. Except for the direction of the threads on their stems 16, the stubs 14, 15 are identical. Each of the stubs 14, 15 is provided with a yoke or clevis 17 adapted to receive a cable eye 18 which may be secured to the yoke by a bolt or clevis pin 19 and cooperating nut 20 or other suitable means.

The locking member or clip of the invention is indicated generally in the drawing by the numeral 24. The clip may be formed as a sheet metal stamping and comprises a link engaging end portion having sections or sides 25, 26, 27 and 28, forming four sides of a hexagon adapted to fit cooperatively the hexagonal barrel 10. Extending from the sides 25 and 28 are reversely bent continuations or ears 29 which form spring catches for engaging the barrel 10 to hold the clip in position thereon. The ears 29 may be provided with openings 30 for receiving a cotter key or wire 31 to lock the clip positively upon the barrel 10. The sides 25, 28 are elongated and define a fork 32 for pivotally mounting the clip upon the stub 14 or 15 of the turnbuckle. Preferably the legs of the fork 32 are provided with apertures 33 for receiving the clevis pin 19. Washers 34 may be provided between fork legs and the nut 20 and head of the bolt 19.

The turnbuckle in Fig. 1 is illustrated with clips 24 at each of the opposite ends thereof, the clip in the foreground being shown in the released position, and the clip at the far end of the turnbuckle being shown in the locking position. It is, of course, not necessary that the released locking clip 24 be swung up as far as shown in Fig. 1, but may merely be swung far enough to permit turning of the barrel 10. The turnbuckle of the invention is thus very well adapted for use at very close quarters. For example, with a turnbuckle of the proportions indicated in the drawing and having a barrel 10 approximately three-eighths inch in width, only about five-eighths inch clearance between the turnbuckle axis and adjacent obstruction is required to permit the clip 24 to be swung up far enough to release the barrel 10 for turning.

Inasmuch as the barrel 10 is of uniform cross-section throughout its length the clip 24 may be engaged at any point along the length of the barrel 10 permitting a relatively wide range of adjustment.

As a general rule a threaded bolt or similar member should be engaged by an axial length equal to its diameter to assure that the threads will not shear at loads less than the tensile strength of the member. To assure that the stubs 14, 15 are so engaged in the barrel 10, preferably the clips 24 are of such length that in the locked position the free end of a clip is spaced rearwardly of the end of the corresponding stub by a distance $a$ substantially equal to the diameter of the stub. With such an arrangement the stub will have to be threaded into the barrel 10 by the distance $a$, the desired minimum as explained above, before the clip will engage the barrel. Thus a convenient and sure means is provided of determining whether the required minimum thread length is engaged, for it may be easily determined either visually or manually whether the clip 24 is in locking position upon the barrel 10.

In the conventional turnbuckle provided heretofore, the stub shanks have been threaded only adjacent their tips, with a reduced unthreaded section adjacent their outer ends to facilitate inspection. This permits counting threads to see that maximum extension is not exceeded. For example, in one standard construction, the threaded and unthreaded sections of the stub shank are proportioned so that the maximum extension is had when three threads are visible outside the turnbuckle barrel. However, the provision of an unthreaded neck weakens the turnbuckle at the point of failure. On the other hand, with the turnbuckle of the present invention, the stub shanks 16 may be threaded for the entire length, avoiding any reduced section or shoulder thereon, thus increasing the safe load which may be carried and also permitting greater latitude of adjustment of the turnbuckle.

While the turnbuckle has been illustrated as having locking clips provided at each of the opposite ends, obviously it will not be necessary in all cases that two clips be provided, particularly where one of the turnbuckle stubs is positively secured against rotation.

Preferably the clip 24 is of relatively heavy sheet metal and since the barrel 10 and clip are normally of relatively small dimension, as indicated hereinbefore, the clip will be relatively stiff. To facilitate disengagement of the clip 24 from the barrel 10, the ears 29 preferably are relatively long, that is extend outwardly of the barrel 10 or downwardly as shown in Fig. 4. This preferred construction facilitates the manipulation of a screwdriver or other tool in prying apart the ears 29 to permit removal of the clip 24 from the barrel.

Having illustrated and described a preferred embodiment of the invention, it should be apparent to those skilled in the art that the invention permits of modification in arrangement and detail. I claim as my invention all such modifications as come within the true spirit and scope of the appended claim.

I claim:

A turnbuckle comprising an elongate hexagonal barrel having an axial threaded bore, an eyebolt having an eyed head and a cooperatively threaded shank engaged in said bore, a unitary sheet metal locking member having a forked end for receiving said bolt head, a pin passing through said forked end and said head for pivotally mounting said member upon said eyebolt, the other end of said locking member being formed to snap over and lockingly engage said barrel, said locking member terminating short of the free end of said shank by a distance substantially equal to the diameter of said shank whereby said shank must be threaded into said barrel by at least said distance to permit engagement of said locking member with said barrel.

References Cited in the file of this patent

UNITED STATES PATENTS

| 1,296,835 | Monsen | Mar. 11, 1919 |
| 1,411,279 | Jaynes | Apr. 4, 1922 |
| 2,395,546 | Harrington | Feb. 26, 1946 |
| 2,479,172 | Landon | Aug. 16, 1949 |
| 2,648,997 | Sawyer | Aug. 18, 1953 |
| 2,671,681 | Wille | Mar. 9, 1954 |

FOREIGN PATENTS

| 446,139 | France | Sept. 24, 1912 |
| 288,619 | Germany | Nov. 10, 1915 |
| 589,414 | Germany | Dec. 14, 1933 |